Feb. 21, 1950 E. GORIN 2,498,546
MANUFACTURE OF HALOGENATED HYDROCARBONS
Filed Jan. 11, 1946
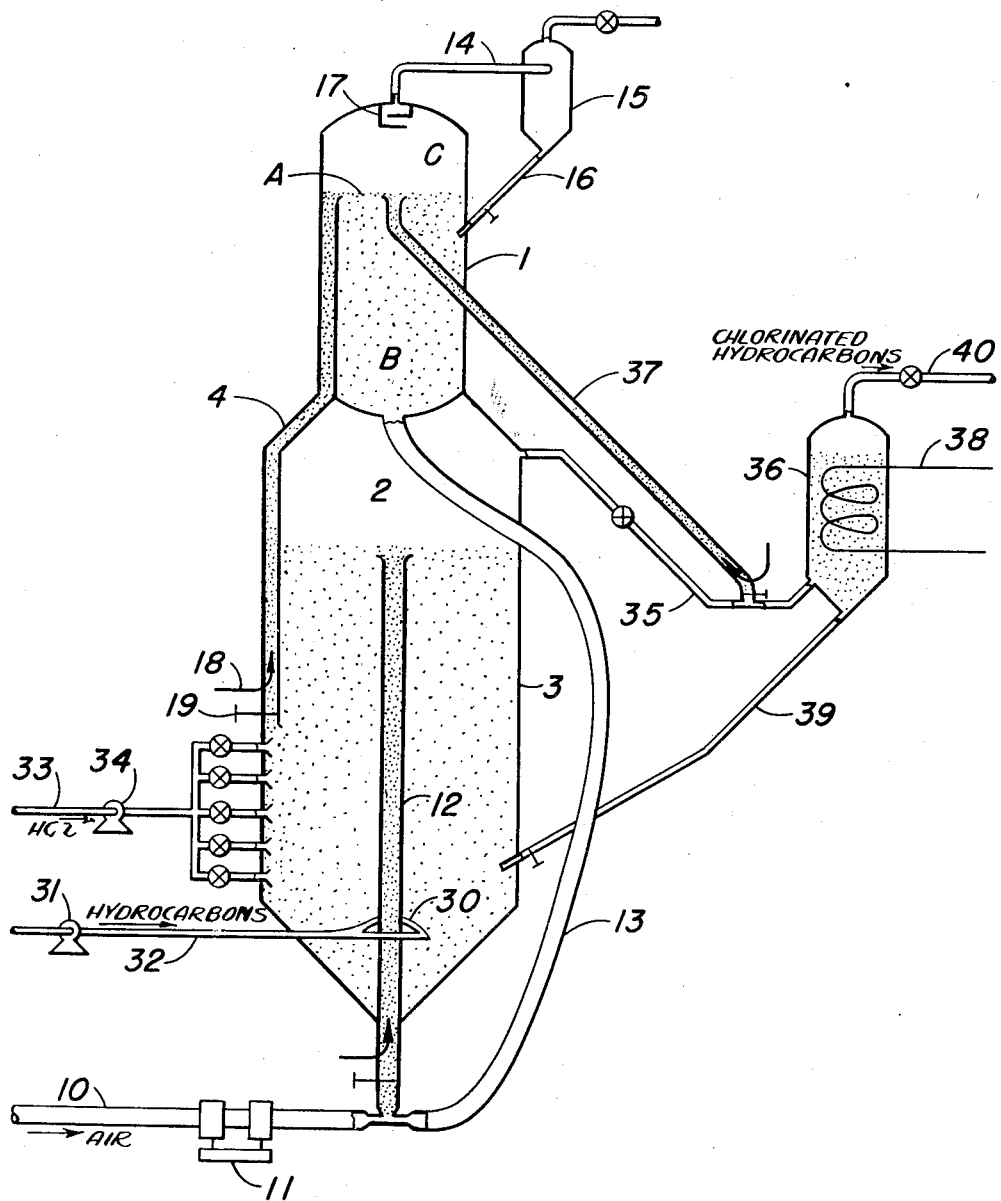
Everett Gorin
INVENTOR
BY John C. Stauffer
ATTORNEY Patented Feb. 21, 1950

2,498,546

UNITED STATES PATENT OFFICE 2,498,546

MANUFACTURE OF HALOGENATED HYDROCARBONS

Everett Gorin, Dallas, Tex., assignor, by mesne assignments, to Socony-Vacuum Oil Company, Incorporated, New York, N. Y., a corporation of New York Application January 11, 1946, Serial No. 640,651

11 Claims. (Cl. 260—659)

This invention relates to the manufacture of chlorinated hydrocarbons. More particularly, this invention relates to a method for the continuous production of alkyl chlorides such as methyl chloride from natural gas and hydrogen chloride wherein the hydrogen chloride produced in the chlorination process is converted in situ to chlorinating agent.

Various chlorinated hydrocarbons are of great importance in the organic chemical and petroleum industries, as reactive intermediates for the production of many essential materials. The manufacture of butadiene from dichlorbutane and the alkylation of methyl chloride with benzene to give toluene are examples of the industrial application of these chlorides of hydrocarbons. Methyl chloride in particular is a valuable intermediate for the production of benzene, toluene, acetylene, and ethylene from methane, the principal component of natural gas. In all of these processes hydrochloric acid is liberated in the production of the chlorides by the chlorination procedure and in the subsequent conversion of the chlorides to final products. The commercial feasibilty of most of these processes depends upon the economical recovery of the hydrogen chloride produced and reconversion of the same to chlorine.

Several prior art methods have attempted the recovery and reconversion of hydrochloric acid by processes wherein the oxidation of the acid with air and the chlorination of methane are carried out simultaneously. For example, it has been suggested that methyl chloride be produced by passing a mixture of methane, hydrogen chloride and air, or oxygen, over a supported copper halide catalyst. The main disadvantage of this type of process lies in the fact that the chlorides of hydrocarbons produced are diluted with large quantities of oxygen depleted air from which the quantitative recovery of the chlorinated hydrocarbon requires additional and expensive processing. Also a considerable loss of hydrocarbon is incurred by direct oxidation thereof to products such as carbon monoxide and carbon dioxide. In addition the recovery and utilization of the hydrogen chloride is not quantitative in that provision must be made for the recovery and recycle of the unreacted hydrogen chloride.

The primary object of the present invention is to provide a continuous method for the production of chlorinated hydrocarbons from light paraffinic hydrocarbons, particularly methane, ethane, propane, butane, and pentane. Another object of the invention is to provide a continuous method for the production of chlorinated hydrocarbons from natural gas. Still another object of the invention is to provide an improved method for effecting contact between the chlorinating reagent and the hydrocarbon gas to be chlorinated. A further object is to provide a continuous method for chlorinating normally gaseous paraffinic hydrocarbons. Still another object of the invention is to provide a continuous process for the manufacture of chlorinated hydrocarbons in quantity with efficient reuse in situ of the hydrogen chloride produced in such process. Other objects of the invention will be apparent from the following detailed description thereof and the accompanying drawing.

In carrying out the present process oxygen is absorbed from the air by cuprous chloride, either in the form of a molten mass containing cuprous chloride or in the form of a finely divided copper chloride impregnated porous solid such as cuprous chloride impregnated alumina gel, cuprous chloride impregnated silica gel or cuprous chloride impregnated natural clay. An alkali metal chloride such as potassium chloride may be included with the cuprous chloride to accelerate the rate of oxygen absorption by the reactant and to decrease the vapor pressure of the copper chlorides. The oxidized reactant is transferred to a separate reaction zone and contacted therein with hydrogen chloride and the hydrocarbon. To the separate zone sufficient chlorine to chlorinate at least a part of the hydrocarbon may also be added as taught and claimed in the copending application of Evert W. Kilgren and Everett Gorin entitled Halogenation process, Serial No. 640,652, filed January 11, 1946.

The process involves three main chemical reactions which may be illustrated by the following equation:

(1) $Cu_2Cl_2 + \tfrac{1}{2}O_2 \rightarrow CuO.CuCl_2$
(2) $CuO.CuCl_2 + 2HCl \rightarrow 2CuCl_2 + H_2O$
(3) $2CuCl_2 + RH \rightarrow Cu_2Cl_2 + RCl + HCl$ Equations 2 and 3 may be combined as Equation 4 to represent the overall reaction taking place in the chlorination zone.

(4) $RH + HCl + CuO.CuCl_2 \rightarrow RCl + Cu_2Cl_2 + H_2O$

The hydrogen chloride formed in the chlorination reaction, as illustrated by Equation 3, is reacted with the oxychloride to form additional cupric chloride chlorinating agent thereby withdrawing the hydrogen chloride from the chlorination zone effluent. Thus, for each mole of cupric oxychloride neutralized two moles of hydrogen chloride are required, one mole being furnished by hydrogen chloride introduced from an external source and another mole of hydrogen chloride being furnished in situ by the action of the cupric chloride product of said neutralization on the hydrocarbon. Hence, for each mole of hydrogen chloride introduced to the neutralization zone there should be introduced to such zone at least one mole of cupric oxychloride. Of the above reactions, reaction (1) is designated as the oxidation step of the process.

The oxidation step of the process is carried out at temperatures within the range of from about 200° C. to about 425° C., preferably from about 350° C. to about 425° C. and at pressures from about atmospheric to ten atmospheres gage. When operating with the reactant in the form of molten mixtures temperatures sufficiently high to keep the salts molten must be used. Depending upon the salt mixture, temperatures of from about 250° to 300° C. represent the minimum.

Equation 2 above is designated the neutralization reaction while Equation 3 is designated the chlorination reaction. Reactions 2 and 3 are carried out at reaction bed temperatures within the range of from 350° C. to 425° C. Satisfactory results may be obtained over the range from about 325° C. to about 450° C. Higher temperatures to 500° C. may be used when operating with molten reactant. The use of powder supported reactant makes lower operating temperatures more practical and desirable since more surface and more intimate contact with the gases may be obtained than are possible when using molten reactant. Temperatures much above 425° C. are not desirable when operating with the halides on inert porous supports because of the tendency of the chlorinated hydrocarbon products to undergo cracking and to be oxidized. The amount of this cracking depends upon the particular support employed and is particularly noticeable with the alumina gel supported reactant where temperatures much above 425° C. are employed.

The preferred embodiment of the invention involves the adaptation of fluid flow of fluidized finely divided solids for contacting the cuprous chloride with air in an oxidation zone and for contacting the oxidized cuprous chloride with a mixture of hydrogen chloride and normally gaseous paraffinic hydrocarbons in a separate reaction zone to chlorinate said hydrocarbons. In another embodiment the copper chlorides, preferably mixed with an alkali metal chloride such as potassium chloride, are circulated between the reaction zones as a molten liquid stream as taught in the copending application of Everett Gorin entitled Acid recovery process, Serial No. 507,,617, filed October 25, 1943, now U. S. Patent 2,418,930.

As indicated hereinabove, an alkali metal chloride such as potassium chloride in amounts within the range of from about 20 mole percent to 45 or 50 mole percent of the total impregnated chlorides increases the rate of oxygen absorption. The melting point of an eutectic mixture containing from 20 to 45 mole percent of potassium chloride with copper chloride or copper chlorides is sufficiently low to permit operation of the process by means of circulating molten mixtures. Halides of metals other than the alkali metals may be used in place of or together with the alkali metal chlorides. Thus, halides of certain heavy metals such as lead, zinc, silver, or thallium may be incorporated with the copper chlorides as melting point depressants or volatility depressants.

When it is desired to operate the process in fluid flow technique with powdered solid impregnated with a copper chloride-potassium chloride mixture, the carrier material may be impregnated with an aqueous solution containing potassium chloride and cupric chloride preferably in relative amounts of about 30 moles of potassium chloride to about 70 moles of cupric chloride. The finely divided carrier is impregnated to the extent of from about 20 percent by weight to about 65 percent by weight of total chlorides based on the total weight of the impregnated mass. The impregnated mass is dried, crushed, and graded. Material passing the 30 mesh standard screen and retained on a 100 mesh standard screen is preferred. However, material as fine as 50 micron diameter may be used. The impregnated finely divided solid agent may be in the form of small spherical bead-like particles of synthetic gel, such as alumina gel, impregnated with the copper chlorides, with or without the alkali metal chloride component. Various methods may be used for preparing the alumina gel beads. One method consists of spraying an atomized stream of the hydrosol into a body of liquid such as a petroleum oil which should contain a gelation agent. If desired, the carrier may be impregnated with cupric chloride alone, the potassium chloride being omitted from the reactant mass.

Since it is desirable to use the impregnated carrier in the oxygen absorption step, a major part of the cupric chloride component must be reduced first to cuprous chloride. This may be accomplished by circulating the cupric chloride impregnated material in contact with a hydrocarbon through the chlorination zone described hereinbelow or by heating the same at a temperature in excess of 500° C. In the absence of alkali metal chlorides, the cupric chloride may be theoretically completely reduced, but practically a small amount of cupric chloride will be retained on the impregnated carrier following reduction of the agent in the chlorination step, and, in actual operation, this will reach a steady state value.

When the potassium chloride is used with the copper chlorides the amount of cupric chloride remaining in the impregnated reduced salt mixture for initial use in the oxygen absorption step preferably should be between about 0.25 to about 1.5 mole per mole of potassium chloride or other alkali metal chloride. The preferred range varies with the potassium chloride content of the reactant mass and lies, for example, between about 0.5 to 1.0 mole of cupric chloride per mole of potassium chloride where 30 mole percent potassium chloride mixtures are used.

Referring to the drawing which represents diagrammatically the hindered flow embodiment of the invention, the oxidation step is carried out in chamber 1. The neutralization and chlorination steps represented by (2) and (3) above are carried out in zone 2 of tower 3. The oxidized agent is transferred from the oxidation zone 1 to the neutralization-chlorination zone 2, through internal standpipe 4. Heated air in line 10 is raised in pressure by compressor 11 and is passed at a temperature of say 275° C. to 300° C. through the injector at the base of standpipe 12 where reduced copper chloride impregnated finely divided particles are picked up and transferred through line 13 and introduced at or near the base of oxidation chamber 1. If desired, transfer line 13 may be used to deliver the suspended particles to an intermediate cyclone separator whence the separated particles are delivered to chamber 1. When operating in this manner a separate stream of air is used to oxidize the agent in chamber 1 and to maintain therein hindered settling conditions. The temperature of the air suspension of particles entering chamber 1 should not exceed 400° C. and preferably should not exceed about 325° C. or 350° C. As this air passes upward in chamber 1 the linear velocity of the air is reduced and the particles suspended therein tend to settle and collect to form a fluidized dense mass of solid particles resembling a boiling liquid with a pseudo interface A between the fluidized relatively dense zone B and zone C, a zone of relatively low concentration of suspended reactant.

The linear velocity of the air in chamber 1 should be within the range of from about 0.25 to 5.0 feet per second depending on the particle size of the supported reactant and on the contact time desired. A linear velocity of about 1.5 feet per second is usually sufficiently low to give substantially complete oxidation of the cuprous chloride to cupric oxychloride where the particle size in a fluidized bed of 5 to 25 feet in depth is within the range of 30 to 100 mesh. If desired, the temperature of the fluidized mass in the oxidation zone may be controlled by means of cooling coils immersed in dense zone B of the reaction zone or a part of the fluidized mass may be withdrawn from dense zone B either continuously or intermittently, passed through a heat exchanger and returned to the reaction zone. The temperature in chamber 1 should not be allowed to go substantially above the chlorination temperature desired in chamber 2. The need for temperature control of the agent in dense zone B may be minimized or eliminated by control of the temperature of the air charged through line 10.

Air, at least partially depleted of oxygen, passes from chamber 1 through line 14 to cyclone separator 15 where the major part of the particles suspended in the residual gas is recovered and returned to chamber 1 via valved dipleg 16. The gaseous effluent may be further purified of residual suspended particles by passing the gas through one or more Cottrell precipitators. If desired, a cooler may be installed in line 14 to cool the gaseous effluent in order to condense any vaporized copper chlorides in the presence of particles suspended in said gaseous effluent whereby at least a part of the vaporized chlorides becomes resorbed with the particles and are therewith returned to the system via dipleg 16. Reaction chamber 1 is provided with baffles 17 in order to reduce the amount of suspended particles carried from the reaction zone.

The oxidized agent in the fluidized bed B overflows into standpipe 4 wherein it collects as a relatively dense mass of settled particles. In order to cause free flow of the settled particles to chlorination zone 2 standpipe 4 may be aerated by means of an inert gas such as flue gas introduced at point 18 above valve 19 and the supported oxidized impregnant is withdrawn from the bottom of standpipe 4 through control valve 19. If desired, hydrogen chloride may be used for aerating and for stripping the mass of particles in standpipe 4 or an inert gas such as flue gas or nitrogen may be used for the stripping operation.

The agent comprising a major proportion of suspended cupric oxychloride is fluidized to form a relatively dense bed in chlorination zone 2 by hydrocarbon vapor introduced to distributing plate 30 by means of compressor 31 in line 32. Hydrogen chloride gas is introduced at a multiplicity of points to zone 2 through line 33 by means of compressor 34. The hydrogen chloride converts the cupric oxychloride to cupric chloride which serves as the chlorinating agent.

Chlorination zone 2 is maintained at a temperature from about 350° C. to about 425° C. The pressure maintained in chamber 2 is somewhat higher than the pressure in chamber 1. The difference in pressure maintained in chambers 2 and 1 is somewhat less than the weight of the fluidized dense column of reactant in standpipe 4 which delivers the oxidized reactant from chamber 1 to chamber 2.

As the mixture of reactant gases pass upward through the fluidized bed in zone 2 the reactions represented by Equations 2 and 3 or by Equation 4 above occur and the cupric oxychloride of the impregnated powder is converted to cupric chloride by neutralization which by reduction forms cuprous chloride. The reduced particles overflow into standpipe 12 whence the same is withdrawn by the air stream in line 10 as described above. Standpipe 12 may be aerated with small amount of hydrogen chloride gas and the aerated mass may be stripped by a suitable inert gas such as nitrogen or flue gas. The vapor product of chlorination zone 2 consisting of unreacted hydrocarbons, chlorinated hydrocarbons, water vapor, suspended powdered agent, and, when chlorinating at temperatures in the upper part of the above range, small amounts of unreacted hydrogen chloride, passes overhead through line 35 to reagent recovery zone 36.

It is highly desirable to recover from the gaseous effluent stream from chlorination zone 2 any hydrogen chloride, vaporized copper chloride reactant and also suspended impregnated powder. The gaseous effluent of the chlorination zone may be scrubbed by a part of the oxidized reactant copper chloride reactant to absorb from the effluent any hydrogen chloride which escapes conversion in the chlorination zone and the nongaseous effluent, that is, the supported reactant or molten liquid from the scrubbing zone is transferred to the chlorination zone to be used as additional chlorinating agent. In the preferred embodiment, the hydrogen chloride and vaporized copper chlorides may be recovered by injecting into the vapor stream in line 35 freshly oxidized supported copper chloride reactant from chamber 1. The effluent is cooled in the presence of the injected particles. The particles are introduced through standpipe 37 which serves as a drawoff line for settle agent from the dense bed B of chamber 1. The column of particles in standpipe 37 may be aerated by means of flue gas. The injected agent is maintained in a state of hindered settling in recovery zone 36 by means of gaseous effluent and the fluidized mass is cooled by means of coil 38 to a temperature preferably below 300° C. The hydrogen chloride is removed by neutralization of the oxychloride and vaporized copper halides are resorbed on the cooled agent. The settled particles may then be returned to chlorination zone 2 through dipleg 39. While I prefer the above method of recovery of hydrogen chloride, other methods well known to the art may be used for removing small amounts of hydrogen chloride from the product effluent, such as, for example, recovery of hydrogen chloride by scrubbing the gas with water or other suitable solvent.

The partially clarified gaseous effluent from recovery zone 36 passes overhead through line 40 to cyclone separators and Cottrell precipitators for final clarification and thence to an absorption and fractionation system for separation of chlorinated hydrocarbons from unreacted hydrocarbon. Unreacted hydrocarbon is recycled to line 32 for successive passes through the chlorination zone. If desired, partially chlorinated hydrocarbons may be recycled to zone 2 in order to more completely chlorinate the partially chlorinated product.

There are several advantages to be gained by isolating the cuprous chloride oxidation step of the process, represented by Equation 1 above, from the neutralization and chlorination steps represented by Equations 2, 3, and 4, and combining the latter steps in a single reaction zone. It is desirable to produce a gaseous product effluent substantially free of nitrogen and residual oxygen diluent and hence the oxidation reaction is carried out in isolated zone I. The neutralization reaction, (Equation 2) is exothermic while the chlorination of hydrocarbons by means of cupric chloride (Equation 3) is endothermic, thus making it possible to maintain a heat balance without requiring the addition of heat to zone 2 by indirect means. It is also desirable to recover in situ the by-product hydrogen chloride formed in chlorinating hydrocarbons such as methane, thus obtaining a chlorinated product substantially free of hydrogen chloride.

While the above description is given as a specific example and specific conditions are indicated, it should be understood that the invention is not limited to this particular example. Alternative methods of operating a continuous hydrocarbon chlorination process may be used wherein chlorides of copper are utilized in successive oxidation neutralization and hydrocarbon chlorination reactions and wherein the neutralization and chlorination reactions are carried out in the same reaction zone. Thus, as indicated above, the reactants may be circulated as melts between the reaction zones or the copper chlorides may be impregnated in relatively large particles of porous solid carrier material which may be contacted with the reactant gases in the form of continuously moving beds in the oxidation zone and in the separate neutralization-hydrocarbon chlorination zone in which type operation transfer of the supported copper chloride agent between reaction zones may be made by gravity and/or by a mechanical conveyor system. It will be readily apparent to those skilled in the art the invention may variously be practiced and embodied within the scope of the claims hereinafter made.

I claim:

1. The process for the chlorination of paraffinic hydrocarbons which comprises introducing the hydrocarbons to be chlorinated and hydrogen chloride into a chlorination zone, introducing cupric oxychloride into said chlorination zone, maintaining a temperature within the range of from about 325° C. to about 500° C. in said chlorination zone, regulating the rate of introduction of said cupric oxychloride so that at least one mole of oxychloride is introduced per mole of hydrogen chloride introduced thereto, and recovering the chlorinated hydrocarbons from the gaseous effluent from said chlorination zone.

2. The process for the chlorination of methane which comprises introducing methane and hydrogen chloride into a chlorination zone, introducing cupric oxychloride into said chlorination zone, maintaining a temperature within the range of from about 325° C. to about 500° C. in said chlorination zone, regulating the rate of introduction of said cupric oxychloride so that at least one mole of the oxychloride is introduced per mole of hydrogen chloride introduced thereto, and recovering the chlorinated methane from the gaseous effluent from said chlorination zone.

3. The continuous process for the chlorination of normally gaseous paraffinic hydrocarbons which comprises the steps of (1) continuously maintaining in a reaction zone a relatively dense fluidized mass of finely divided solid having cuprous chloride sorbed therewith in a fluidizing gas consisting essentially of a free oxygen containing gas at a temperature such that the cuprous chloride is converted to supported cupric oxychloride, (2) continuously withdrawing oxygen depleted fluidizing gas from said reaction zone, (3) continuously transferring said supported cupric oxychloride to a second reaction zone, (4) continuously maintaining at a temperature within the range of from about 325° to about 500° C. in said second reaction zone a relatively dense fluidized mass of said supported cupric oxychloride by means of an ascending stream of gas consisting essentially of the gaseous paraffinic hydrocarbons to be chlorinated, chlorinated hydrocarbons and sufficient hydrogen chloride to substantially completely neutralize said cupric oxychloride and convert the same to cupric chloride chlorinating agent, (5) continuously separating a stream of finely divided solid having sorbed therewith at least one copper chloride consisting of a major proportion of cuprous chloride from the relatively dense fluidized mass in said second reaction zone, (6) continuously circulating in gaseous suspension by means of a free oxygen containing gas the separated stream of finely divided solid of step 5 to step 1, and (7) recovering the chlorinated hydrocarbon from the gaseous effluent of said second reaction zone.

4. The continuous process for the chlorination of methane which comprises the steps of (1) continuously maintaining in a reaction zone a relatively dense fluidized mass of finely divided solid having cuprous chloride sorbed therewith in a fluidizing gas consisting essentially of a free oxygen containing gas at a temperature such that the cuprous chloride is converted to supported cupric oxychloride, (2) continuously withdrawing oxygen depleted fluidizing gas from said reaction zone, (3) continuously transferring said supported cupric oxychloride to a second reaction zone, (4) continuously maintaining at a temperature within the range of from about 325° to about 500° C. in said second reaction zone a relatively dense fluidized mass of said supported cupric oxychloride by means of an ascending stream of gas consisting essentially of the methane to be chlorinated, chlorinated hydrocarbons and sufficient hydrogen chloride to substantially completely neutralize said cupric oxychloride and convert the same to cupric chloride chlorinating agent, (5) continuously separating a stream of finely divided solid having sorbed therewith at least one copper chloride consisting of a major proportion of cuprous chloride from the relatively dense fluidized mass in said second reaction zone, (6) continuously circulating in gaseous suspension by means of a free oxygen containing gas the separated stream of finely divided solid of step 5 to step 1, and (7) recovering the chlorinated methane from the gaseous effluent of said second reaction zone.

5. The process for the chlorination of normally gaseous paraffinic hydrocarbons which comprises suspending a cupric oxychloride impregnated inert carrier by means of a gaseous mixture consisting essentially of at least one normally gaseous paraffinic hydrocarbon and hydrogen chloride in a reaction zone maintained at a temperature within the range of from about 325° to about 500° C. whereby said cupric oxychloride is converted to cupric chloride, said cupric chloride is reduced to cuprous chloride and said hydrocarbon is at least partially converted to at least one chlorinated hydrocarbon, separating the gaseous reaction product from supported cuprous chloride in said reaction zone and fractionating the gaseous reaction product to recover the chlorinated hydrocarbon.

6. The process for the chlorination of paraffinic hydrocarbons containing not more than five carbon atoms per molecule which comprises the steps of (1) continuously oxidizing cuprous chloride to cupric oxychloride at a temperature within the range of from about 200° C. to about 425° C. by means of a free oxygen containing gas in a reaction zone, (2) continuously transferring the cupric oxychloride of step 1 to a second reaction zone, (3) continuously contacting the cupric oxychloride in said second reaction zone at a temperature within the range of from about 325° to about 500° C. with a gaseous mixture consisting essentially of hydrogen chloride and the paraffinic hydrocarbon to be chlorinated whereby said hydrocarbon is chlorinated, and (4) continuously recovering chlorinated hydrocarbon from the gaseous effluent of said second reaction zone.

7. The process for the chlorination of paraffinic hydrocarbons containing not more than five carbon atoms per molecule which comprises the steps of (1) continuously oxidizing cuprous chloride to cupric oxychloride at a temperature within the range of from about 200° C. to about 425° C. by means of a free oxygen containing gas in a reaction zone, (2) continuously transferring the cupric oxychloride of step 1 to a second reaction zone, (3) continuously contacting the cupric oxychloride in second reaction zone at a temperature within the range of from about 350° C. to about 425° C. with a gaseous mixture consisting essentially of hydrogen chloride and the paraffinic hydrocarbon to be chlorinated whereby said hydrocarbon is chlorinated and cuprous chloride is produced, (4) continuously circulating said cuprous chloride to step 1 of the process, and (5) continuously recovering chlorinated hydrocarbon from the gaseous effluent of said second reaction zone.

8. The process for the chlorination of methane which comprises the steps of (1) continuously oxidizing cuprous chloride to cupric oxychloride at a temperature within the range of from about 200° C. to about 425° C. by means of a free oxygen containing gas in a reaction zone, (2) continuously transferring the cupric oxychloride of step 1 to a second reaction zone, (3) continuously contacting the cupric oxychloride in said second reaction zone with a gaseous mixture consisting essentially of hydrogen chloride and methane at a temperature within the range of from about 325° to about 500° C. whereby said methane is chlorinated and cuprous chloride is produced, (4) continuously circulating said cuprous chloride to step 1 of the process, and (5) continuously recovering chlorinated methane from the gaseous effluent of said second reaction zone.

9. The process for the chlorination of paraffinic hydrocarbons which comprises the steps of (1) continuously introducing inert finely divided porous solid particles impregnated with cupric oxychloride into a reaction zone, (2) continuously introducing a gas mixture consisting essentially of the paraffinic hydrocarbon and hydrogen chloride into the lower portion of the reaction zone at a rate such that the finely divided particles are suspended as a relatively dense fluidized mass, (3) maintaining a temperature within the range of from about 325° C. to about 500° C. in the reaction zone whereby the hydrocarbon is chlorinated and the cupric oxychloride is reduced to cuprous chloride, (4) continuously withdrawing cuprous chloride impregnated particles from said reaction zone, (5) regulating the rate of introduction of particles to said reaction zone so that at least one mole of oxychloride is introduced per mole of hydrogen chloride introduced, and (6) recovering the chlorinated hydrocarbons from the effluent gaseous mixture from said reaction zone.

10. The process of claim 9 wherein the paraffinic hydrocarbon component of the gas mixture is natural gas.

11. The process of claim 9 wherein the porous solid particles are alumina gel beads.

EVERETT GORIN.

REFERENCES CITED

The following references are of record in the file of this patent:

UNITED STATES PATENTS

| Number | Name | Date |
|---|---|---|
| 1,654,821 | Krause et al. | Jan. 3, 1928 |
| 2,399,488 | Hearne | Apr. 30, 1946 |
| 2,407,828 | Gorin | Sept. 17, 1946 |

FOREIGN PATENTS

| Number | Country | Date |
|---|---|---|
| 108,421 | Austria | Dec. 27, 1927 |
| 214,293 | Great Britain | Apr. 14, 1924 |
| 430,539 | Germany | June 23, 1926 |
| 486,952 | Germany | Nov. 30, 1929 |
| 513,947 | Great Britain | Oct. 26, 1939 |
| 559,080 | Great Britain | Feb. 3, 1944 |